US009837864B2

(12) United States Patent
Mehas et al.

(10) Patent No.: US 9,837,864 B2
(45) Date of Patent: Dec. 5, 2017

(54) APPARATUSES AND WIRELESS POWER TRANSMITTERS HAVING MULTIPLE TRANSMIT COILS AND RELATED METHOD

(71) Applicant: Integrated Device Technology, Inc., San Jose, CA (US)

(72) Inventors: Gustavo J. Mehas, Mercer Island, WA (US); Nicholaus W. Smith, Duluth, GA (US); Adam M. Bumgarner, Duluth, GA (US)

(73) Assignee: Integrated Device Technology, Inc., San Jose, CA (US)

( * ) Notice: Subject to any disclaimer, the term of this patent is extended or adjusted under 35 U.S.C. 154(b) by 127 days.

(21) Appl. No.: 14/670,371

(22) Filed: Mar. 26, 2015

(65) Prior Publication Data

US 2016/0285278 A1  Sep. 29, 2016

(51) Int. Cl.
*H01F 27/42* (2006.01)
*H01F 37/00* (2006.01)
*H01F 38/00* (2006.01)
*H02J 50/12* (2016.01)
*H02J 7/02* (2016.01)

(52) U.S. Cl.
CPC ............... *H02J 50/12* (2016.02); *H02J 7/025* (2013.01)

(58) Field of Classification Search
CPC .. H02J 5/005; H02J 7/025; H02J 17/00; H02J 50/12; H02J 50/10; H02J 50/80; H02J 50/90; H02J 50/40; H02J 50/60; H02J 50/20; H02J 2007/0096; H02J 7/0042; H02J 50/50; H02J 7/0054; H02J 50/00

USPC .......................................................... 307/104
See application file for complete search history.

(56) References Cited

U.S. PATENT DOCUMENTS

| 7,501,828 B1* | 3/2009 | Wong ............... G01R 33/34046 324/318 |
| 8,941,268 B2* | 1/2015 | Suzuki ..................... H02J 5/005 307/104 |

(Continued)

OTHER PUBLICATIONS

Gao, Xiang, "Low-Power Wireless Charger Transmitter Design Using MC56F8006 DSC," Application Note, Mar. 2013, 25 pages, AN4705, Freescale Semiconductor, Inc.

(Continued)

*Primary Examiner* — Jared Fureman
*Assistant Examiner* — Esayas Yeshaw
(74) *Attorney, Agent, or Firm* — Haynes and Boone, LLP (57) ABSTRACT

A wireless power transmitter may include a bridge inverter and a plurality of parallel paths operably coupled to the bridge inverter. Each path includes a resonance tank including a transmit coil coupled with at least one resonance capacitor, a first switch serially coupled with the resonance tank and switching node A of the bridge inverter, a first clamping element in parallel with the first switch, a second switch serially coupled with the resonance tank and switching node B of the bridge inverter, and a second clamping element in parallel with the second switch. A method includes generating a wireless power signal through a used coil in a first parallel path, and clamping a parasitic voltage generated in at least one unused coil in at least one additional parallel path through a clamp element across a switch in the at least one parallel path for the at least one unused coil.

24 Claims, 6 Drawing Sheets

(56) References Cited

U.S. PATENT DOCUMENTS

| | | | | |
|---|---|---|---|---|
| 2005/0043918 A1* | 2/2005 | Katsurahira | .......... | G06F 1/3203 |
| | | | | 702/178 |
| 2005/0288740 A1* | 12/2005 | Hassler | ................ | A61N 1/3787 |
| | | | | 607/61 |
| 2009/0096413 A1* | 4/2009 | Partovi | ................... | H01F 5/003 |
| | | | | 320/108 |
| 2011/0026799 A1* | 2/2011 | Nehrke | ................ | G01R 33/246 |
| | | | | 382/131 |
| 2014/0132077 A1* | 5/2014 | Nalbant | ................. | H02M 1/38 |
| | | | | 307/104 |
| 2014/0240383 A1* | 8/2014 | Penberth | ............... | H01L 41/042 |
| | | | | 347/10 |
| 2014/0265884 A1* | 9/2014 | Chung | ............... | H05B 33/0821 |
| | | | | 315/185 R |
| 2015/0084427 A1* | 3/2015 | Moon | .................... | H01F 38/14 |
| | | | | 307/104 |
| 2015/0115730 A1* | 4/2015 | Kanno | ................... | H02J 5/005 |
| | | | | 307/104 |
| 2015/0244176 A1* | 8/2015 | Van Den Brink | ...... | H02J 5/005 |
| | | | | 307/104 |
| 2016/0308397 A1* | 10/2016 | Jung | ....................... | H02J 50/12 |

OTHER PUBLICATIONS

"WPC1.1-Compatible A5/A11 Wireless Power Transmitter: IDTP9038," Product Preview & Datasheet, 2013, 24 pages, Version 0.8, Integrated Device Technology, Inc.

\* cited by examiner

APPARATUSES AND WIRELESS POWER TRANSMITTERS HAVING MULTIPLE TRANSMIT COILS AND RELATED METHOD

FIELD

Embodiments of the present disclosure relate generally to wireless power transfer and, more particularly, to apparatuses and related method for clamping voltages for wireless power transmitters having multiple transmit coils.

BACKGROUND

Battery-powered devices (e.g., consumer electronic devices, electric and hybrid automobiles, etc.) are charged from a power source (e.g., AC power outlet) through a charging device. The charging device couples the battery to the power source through an adaptor. The cord extending between the power source and the battery-powered device can take up space. In situations where multiple devices require charging, each with their own charger and cord, the charging area can become cramped and inconvenient.

Approaches are being developed that use over-the-air or wireless power transmission between a transmitter and a receiver coupled to the electronic device. Wireless power transmission using inductive coils is one method considered as an un-tethered method for transferring power wirelessly through a coupled wireless power signal. In wireless power transmission, power is transferred by transmitting a wireless power signal through a transmit coil. On the receiver side, a receive coil may couple with the transmit coil through the wireless power signal, thus, receiving the transmitted power wirelessly. The distance between the transmitter coil and receive coil, at which efficient power transfer can take place, is a function of the transmitted energy, the distance, and the alignment of the power transfer coils. The coupling coefficient (k) is a function of the distance and alignment between the coils, the coil sizes, and materials. The power conversion efficiency (e.g., coupling factor, coupling quality) may be significantly improved if the coils are sized and operated at such a frequency that they are physically within the so-called "near-field zone" of each other.

Wireless power transmitters sometimes have a plurality of transmit coils so that the wireless power receiver has multiple locations (e.g., within a charging pad) to draw power from. Typically, only one of the transmit coils transmits at a given time in order to conserve power as well as reduce potential adverse effects on the wireless power receiver and/or foreign objects.

Conventional low voltage transmitters may require high current to deliver power at a suitable level (e.g., 5 W). High current results in a stronger magnetic field (B-field), which in turn can couple (i.e., parasitic coupling) into an adjacent unused coil, which may generate high voltages and current in portions of the circuits that are not being used. As a result, the efficiency of the wireless power transfer may be reduced as energy may be lost from the system through the parasitic coupling with the unused coil, and components with higher voltage ratings may be needed to prevent damage to the electronic subsystems that comprise the wireless power transfer system.

BRIEF SUMMARY

Embodiments of the present disclosure include a wireless power enabled apparatus, comprising a wireless power transmitter. The wireless power transmitter includes a plurality of transmit coils configured to generate a wireless power signal for wireless power transfer to a wireless power receiver, a bridge inverter configured to generate an AC signal to pass through the plurality of transmit coils, and a switching circuit operably coupled with the plurality of transmit coils and configured to enable and disable the transmit coils responsive to a control signal from a transmitter controller. The switching circuit includes a first plurality of switches serially coupled on opposing sides of a first transmit coil of the plurality of transmit coils, a first plurality of clamp elements, each clamp element coupled across a respective switch of the first plurality of switches and configured to extract energy away from the first transmit coil, a second plurality of switches serially coupled on opposing sides of a second transmit coil of the plurality of transmit coils, and a second plurality of clamp elements. Each clamp element is coupled across a respective switch of the second plurality of switches and configured to extract energy away from the second transmit coil. The bridge inverter may be in a full bridge configuration, a half bridge configuration, or operable in either a full bridge or half bridge operation.

Another embodiment of the present disclosure includes a wireless power enabled apparatus comprising a bridge inverter configured to generate an AC signal at an operating frequency and a plurality of parallel paths operably coupled to the bridge inverter. Each path is configured to be independently enabled and disabled for generating a wireless power signal responsive to the AC signal. Each path of the plurality of parallel paths includes a resonance tank including a transmit coil coupled with at least one resonance capacitor, a first switch serially coupled with the resonance tank and switching node A of the bridge inverter, a first clamping element in parallel with the first switch, a second switch serially coupled with the resonance tank and switching node B of the bridge inverter, and a second clamping element in parallel with the second switch.

Another embodiment of the present disclosure includes a method of operating a wireless power enabled apparatus having a plurality of transmit coils. The method comprises generating a wireless power signal through a used coil in a first parallel path responsive to an AC signal generated by a bridge inverter, and clamping a parasitic voltage generated in at least one unused coil in at least one additional parallel path such that energy is recycled from the at least one unused coil into a main loop of the used coil through a clamp element across a switch in the at least one parallel path for the at least one unused coil.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. All of which may be termed a "controller" or "control logic."

A general-purpose processor may be a microprocessor, but in the alternative, the general-purpose processor may be any processor, controller, microcontroller, or state machine suitable for carrying out processes of the present disclosure. A processor may also be implemented as a combination of computing devices, such as a combination of a DSP and a microprocessor, a plurality of microprocessors, one or more microprocessors in conjunction with a DSP core, or any other such configuration. A general-purpose processor may be part of a general-purpose computer, which should be considered a special-purpose computer when configured to execute instructions (e.g., software code) for carrying out embodiments of the present disclosure. Moreover, when configured according to embodiments of the present disclosure, such a special-purpose computer improves the function of a general-purpose computer because, absent the present disclosure, the general-purpose computer would not be able to carry out the processes of the present disclosure.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

It should be recognized that the devices of a wireless power transfer system is described herein primarily with respect to functionality of wireless power transfer; however, it should be recognized that the wireless power transfer system may include additional components to perform other features not specifically described herein or shown in the various figures. For example, wireless power enabled devices may include communication modules, foreign object detection modules, I/O modules for interfacing with a user, memory for storing instructions and data, various sensors, processors, controllers, voltage regulators, among other components. The figures and accompanying description may, therefore, be somewhat simplified to focus on the various apparatuses and methods described herein.

Figure 1:
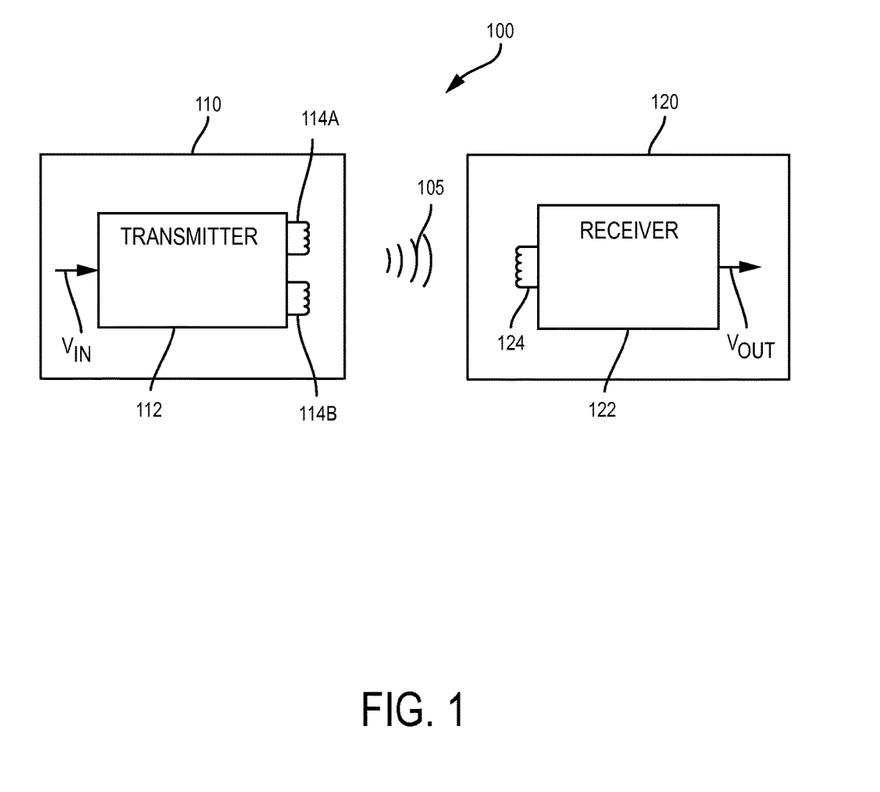
FIG. 1 is a schematic block diagram of a wireless power transfer system according to an embodiment of the present disclosure.

FIG. 1 is a schematic block diagram of a wireless power transfer system 100. The wireless power transfer system 100 includes a wireless power transmitting apparatus 110, and a wireless power receiving apparatus 120. The wireless power transmitting apparatus 110 includes a wireless power transmitter 112 having a plurality of transmit coils 114A, 114B configured to generate a wireless power signal 105 (e.g., electric field, magnetic field, electromagnetic field, etc.) for providing power transfer (e.g., through inductive coupling) to the wireless power receiving apparatus 120. The wireless power receiving apparatus 120 includes a wireless power receiver 122 having a receive coil 124 configured to couple with the wireless power signal 105. The transmit coils 114A, 114B and the receive coil 124 may be sized according to the particular devices and applications to be associated therewith.

As discussed above, wireless power transmitters 112 sometimes have a plurality of transmit coils 114A, 114B so that the wireless power receiver 122 has multiple locations to draw power from. Thus, wireless receivers may be placed on the transmitting pad containing the plurality of transmit coils with a certain level of placement freedom, while also maintaining high operating efficiency. Typically, only one of the transmit coils 114A, 114B is active at time in order to save cost and complexity associated with attempting to operate two or more transmit coils in close proximity simultaneously, as well as to reduce potential adverse effects on the wireless power receiver 122 and/or foreign objects. The wireless power transmitter 112 may detect which transmit coil 114A, 114B is more aligned with the receive coil 124 to determine which transmit coil 114A, 114B to enable for generating the wireless power signal 105. As a result, the effects of misalignment of the receive coil 124 may be reduced for a more efficient wireless power transfer. At times, the transmit coils 114A, 114B may be referred to collectively as "transmit coil 114" without specific reference to a specific coil in order to simplify the description, recognizing that one of the coils may be generating the wireless power signal 105 (i.e., the "used" coil), and that another coil may not be generating the wireless power signal 105 (i.e., the "unused" coil) at a given time. Over time, the used coil and the unused coil may be reversed, as controlled by the controller (e.g., based on placement of the wireless power receive coil 124). It should also be recognized that although the figures illustrate two transmit coils 114A, 114B, the wireless power transmitter 112 may include additional transmitters. Thus, it is contemplated that embodiments of the disclosure may also include additional transmit coils. In such embodiments, there may be any combination of used coils and unused coils.

The transmit coils 114A, 114B may be physically separated by a distance such that they are weakly coupled during wireless power transmission. The level of coupling may be a function of geometry of the coils, distance between them, power of the wireless power signal, and other application specific features. As used herein, weakly coupled may refer to the amount of energy transferred to the unused coil that would result in clamping losses that may detrimentally impact the foreign object detection error budget. As a result, the natural clamping effects of the diodes may be used without disrupting the foreign object detection system. Error budgets are typically measured in energy dissipation rates or energy dissipated (e.g., Watts, joules, etc.), and voltages may be used to represent an actual state variable.

The wireless power transmitter 112 and the wireless power receiver 122 are separated by a distance (d). In some embodiments, the wireless power transmitter 112 and the wireless power receiver 122 may be configured according to a mutual inductance relationship, such that when the resonant frequency of the wireless power receiver 122 and the resonant frequency of the wireless power transmitter 112 are substantially identical, transmission losses between the wireless power transmitter 112 and the wireless power receiver 122 are minimal. Likewise, the frequency of the wireless power signal 105 may be set by the wireless power transmitter 112 at or near the resonant frequencies of the coils 114, 124. As a result, an effective power transfer may occur by coupling a large portion of the energy in the near-field of the transmit coil 114 to the receive coil 124 rather than propagating most of the energy in an electromagnetic wave to the far-field. If the wireless power receiving apparatus 120 is in the near-field (within some distance (d)), inductive coupling may occur between the transmit coil 114 and the receive coil 124. The area around the transmit coil 114 and the receive coil 124 where this near-field inductive coupling may occur may be referred to as a "coupling region." Because of this mutual inductance relationship, the wireless power transfer may be referred to as inductive, resonant, or near-field wireless power transfer.

The transmit coils 114 and the receive coil 124 may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

In operation, an input signal ($V_{IN}$) may be provided to the wireless power transmitter 112 for generating the wireless power signal 105 that provides a power transfer to the wireless power receiving apparatus 120. The wireless power receiver 122 may couple to the wireless power signal 105 and may generate an output signal ($V_{OUT}$) in response thereto. The output signal ($V_{OUT}$) may provide the power that is used by the wireless power receiving apparatus 120 for storing (e.g., charging a battery), consumption (e.g., providing system power), or a combination thereof.

The wireless power receiving apparatus 120 may be a mobile electronic device, such as a cell phone, a smart phone, a media player (e.g., mp3 player, DVD player, etc.), an electronic reader, a tablet computer, a personal digital assistant (PDA), a camera, a laptop computer, and personal electronic device in which wireless power signal 105 may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110.

The wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation. Thus, embodiments of the present disclosure include devices that may include a wireless charging transceiver configured to operate in either a transmit mode or a receive mode. Using the term "receiver" indicates that a device is configured to receive wireless power transfer, but should not be interpreted to mean that the device only operates as a receiver. Similarly, using the term "transmitter" indicates that the device is configured to transmit wireless power, but should not be interpreted to mean that the device only operates as a transmitter.

Figure 2:
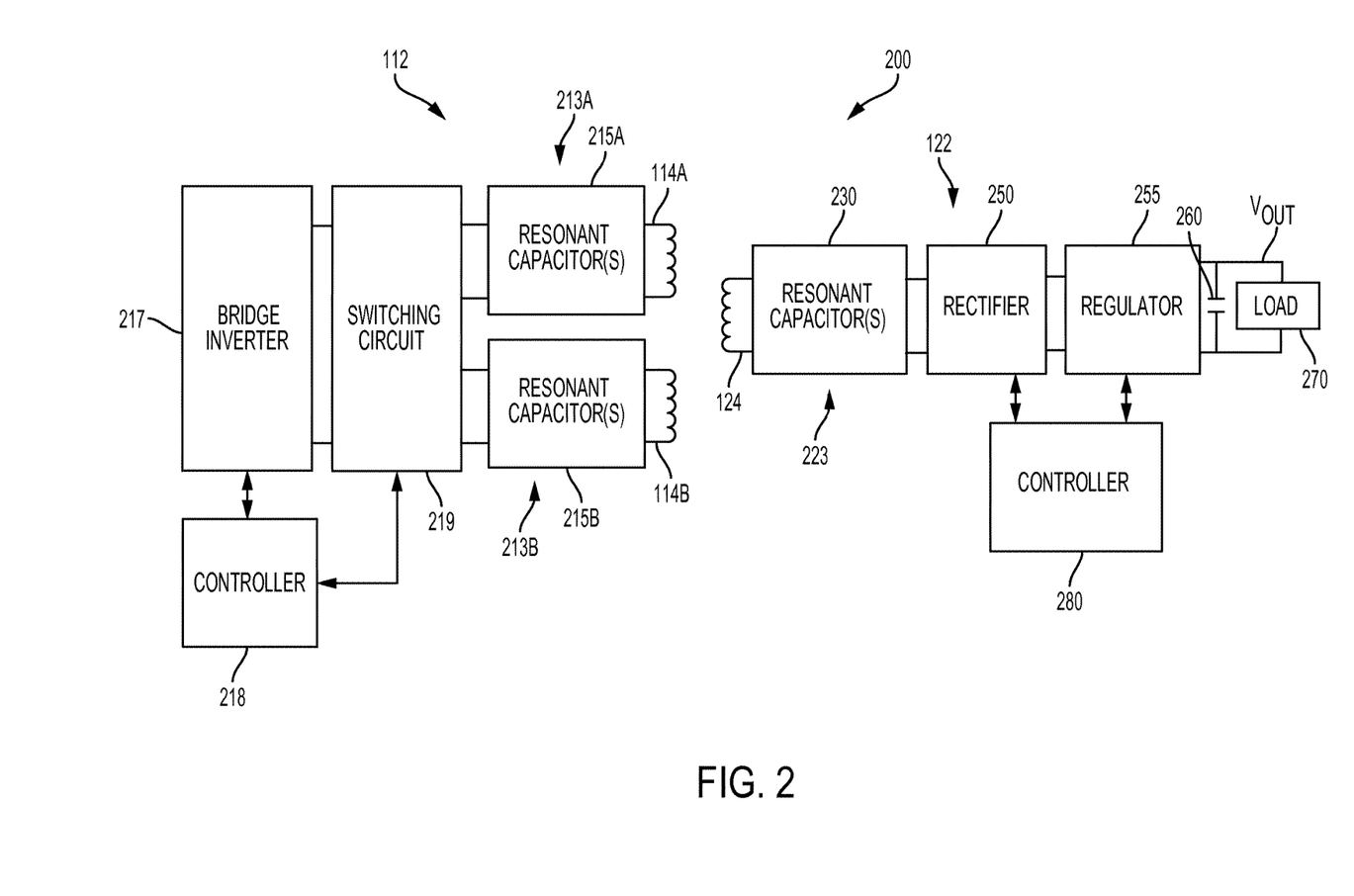
FIG. 2 is a schematic block diagram of a wireless power transfer system according to an embodiment of the present disclosure.

FIG. 2 is a schematic block diagram of a wireless power transfer system 200 according to an embodiment of the present disclosure. The wireless power transfer system 200 may be configured as discussed above with respect to FIG. 1, but with additional description regarding lower level blocks within the wireless power transmitter 112 and a wireless power receiver 122. Thus, the wireless power transmitter 112 and the wireless power receiver 122 may be incorporated within a wireless power transmitting apparatus 110 (FIG. 1) and a wireless power receiving apparatus 120 (FIG. 1), respectively.

The wireless power transmitter 112 may include a bridge inverter 217, transmitter controller 218, a switching circuit 219, and resonance tanks 213A, 213B coupled together to generate the wireless power signal 105 transmitted to the wireless power receiver 122. The resonance tanks 213A, 213B may include the transmit coils 114A, 114B coupled with resonant capacitors 215A, 215B, respectively. The first transmit coil 114A may be coupled with the resonant capacitors 215A, while the second transmit coil 114B may be serially with the resonant capacitors 215B. While the resonant capacitors 215A, 215B are shown as being a block that is coupled to the transmit coils 114A, 114B, it is recognized that individual capacitors within the block may be coupled to one or both sides of the transmit coils 114A, 114B.

Figure 3A:
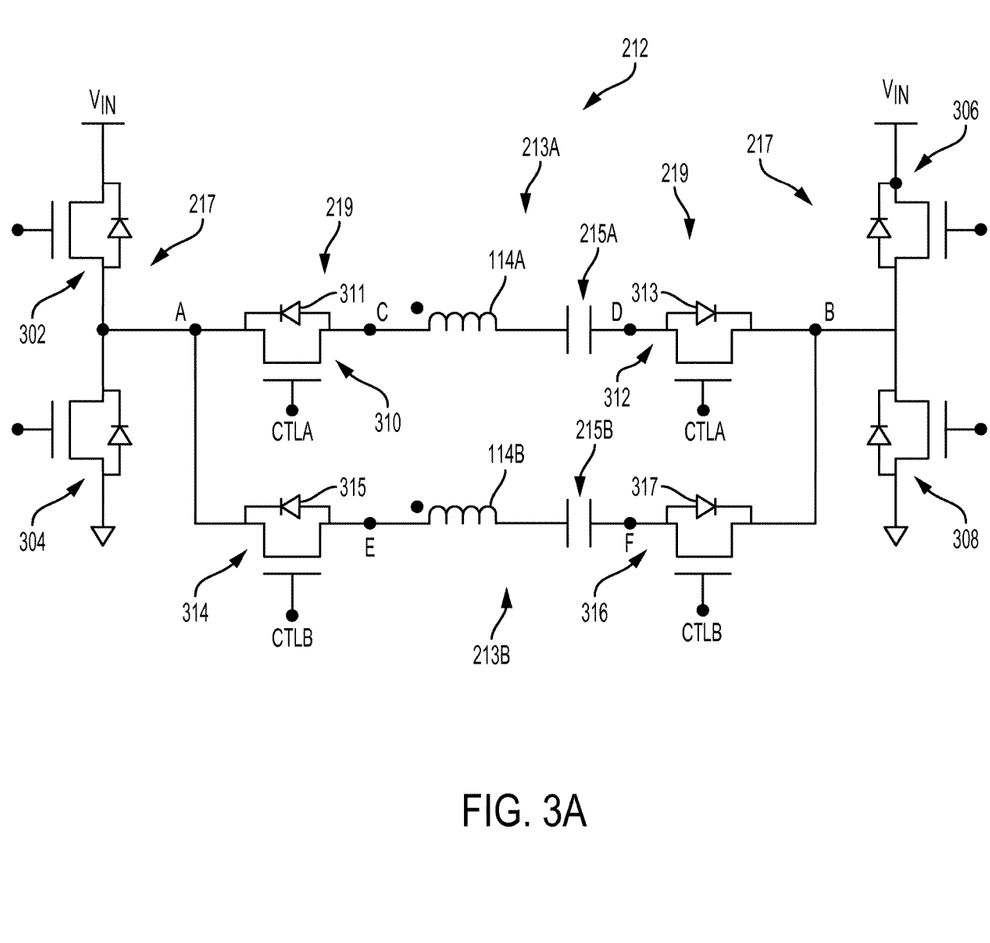
FIG. 3A is a simplified schematic diagram of the wireless power transmitter of FIG. 2.

The bridge inverter 217 of the wireless power transmitter 112 may include a full bridge inverter, half bridge inverter, or other appropriate circuit for receiving a DC input signal ($V_{IN}$) and generate an AC signal through the transmit coil 114 for generating the wireless power signal 105 (FIG. 1). In some embodiments, a full bridge configuration may be operable as a half bridge inverter. The switching circuit 219 may be configured to switch between driving the transmit coils 114A, 114B responsive to control signals received from the transmitter controller 218. Additional detail of the switching circuit 219 will be discussed below with regard to FIG. 3.

The wireless power receiver 122 includes a resonance tank 223, rectifier 250, and a regulator 255, and controller 280 coupled together to receive the wireless power signal 105 and generate an output signal ($V_{OUT}$) in response thereto. The output signal ($V_{OUT}$) may be provided to a load 270 (e.g., a battery, system components, etc.), which may also have an output capacitor 260. The resonance tank 223 may include a receive coil 124 coupled with resonant capacitors 230.

The configurations of the LC networks within the resonance tanks 213, 223 may generally determine the resonant frequencies of the wireless power transmitter 112 and the wireless power receiver 122, respectively. For example, the resonant frequency of the resonance tanks 213, 223 may be based on the inductance of their respective inductive coil and the capacitance of the plates of the capacitors.

During wireless power transmission, the input signal ($V_{IN}$) may be received by the bridge inverter 217. The bridge inverter 217 may generate an AC current that flows through the resonance tank 213 to generate a time-varying signal for transmitting the wireless power signal 105. Thus, the wireless power signal 105 may be a time-varying signal that is substantially sinusoidal, having a frequency that may be based on the switching frequency of the bridge inverter 217 of the wireless power transmitter 112. In some embodiments, the frequency of the wireless power signal 105 may be set according to the desired frequency, such as a frequency for a particular wireless power standard. The resonance tank 213 may be configured such that the resonant frequency is approximately the frequency of the wireless power signal 105. In some embodiments, it may be desirable for the frequency of the wireless power signal 105 to differ somewhat from the resonant frequency of the resonance tank 213, such as to reduce the peak-to-peak current through the transmit coil 114.

In order to receive wireless power signal 105, the wireless power receiver 122 may be placed in the coupling region of the wireless power transmitter 112 such that inductive coupling may be achieved. As a result, the wireless power receiver 122 may receive the wireless power signal 105 and generate an AC power responsive thereto. In order for the power to be used by the load 270, the AC power may be converted to a DC power. The rectifier 250 may generate a rectified voltage as well as a rectified current flowing through the resonance tank 223. In some embodiments, the rectifier 250 may be configured as a synchronous rectifier. As a result, the rectifier 250 may include one or more switches that are controlled in such a manner to generate the DC output power signal (i.e., rectified voltage and rectified current). In some embodiments, the rectifier 250 may include one or more diodes configured to generate the DC output power signal.

The regulator 255 may receive the rectified voltage and convert the rectified voltage to have a desired voltage level for the output voltage ($V_{OUT}$). For example, in some embodiments, the regulator 255 may convert the rectified voltage from a low voltage to a relatively higher voltage for the output voltage ($V_{OUT}$). In some embodiments, the regulator 255 may convert the rectified voltage from a high voltage to a relatively lower voltage for the output voltage ($V_{OUT}$). In some embodiments, the regulator 255 may invert the rectified voltage from a positive voltage to a negative voltage, or vice versa. The regulator 255 may be configured according to one of a variety of different voltage regulator topologies. For example, the regulator 255 may be configured according to one or more of a buck topology, a boost topology, a buck-boost topology, an inverting topology, and a low dropout (LDO) topology. In some embodiments, the regulator 255 may be configured according to a transformer-based topology (e.g., forward, flyback, etc.). The operation of the regulator 255 may be controlled by the controller 280 according to the topology being used.

The transmitter controller 218 of the wireless power transmitter 112 may be configured to control one or more operations of the wireless power transmitter 112. The controller 280 of the wireless power receiver 122 may be configured to control one or more operations of the wireless power receiver 122. Each of the controller 218, 280 may be implemented within a processor (e.g., microcontroller) or other circuitry that is configured (e.g., programmed) to perform various operations of embodiments of the present disclosure. Each of the controller 218, 280 may further include computer-readable media (e.g., memory) storing computing instructions for execution by the processor related to performing processes of the embodiments of the present disclosure. Memory may include volatile and non-volatile memory. In addition, each of the controller 218, 280 may further control other functions of the respective wireless power transmitter 112, wireless power receiver 122, such as controls related to foreign object detection, device operation, etc. The controller 218, 280 may each include different sub-blocks that perform one or more of the above functions separately rather than by employing within a single process, routine, program, etc. In addition, the controller 218, 280 may each employ different hardware elements for different functions.

The highest efficiency power transfer may occur when the receive coil 124 and the transmit coil 114 are in positional alignment—that is, when the receive coil 124 is directly over the transmit coil 114. While in alignment, the magnetic flux field may be relatively symmetrical about the receive coil 124, and the efficiency of power transfer may be substantially near its peak. As the receive coil 124 moves off alignment from the transmit coil 114, the efficiency of wireless power transfer may be reduced. Thus, in some embodiments the transmitter controller 218 may control the switching circuit 219 to select the appropriate transmit coil 114 for generating the wireless power signal 105 based on determining which transmit coil 114 is more aligned with the receive coil 124. The presence of a foreign object may likewise distort the magnetic flux field and reduce the efficiency of wireless power transfer. In some embodiments, the transmitter controller 218 may detect a foreign object affecting the efficiency of one of the transmit coils 114 more than the other of the transmit coils 114, and select the appropriate transmit coil 114 for generating the wireless power signal 105 for increased efficiency. The selection of the transmit coils 114 for wireless power transmission may be based on other factors, as desired.

FIG. 3A is a simplified schematic diagram of the wireless power transmitter 112 of FIG. 2. As discussed above, the wireless power transmitter 112 may include the resonance tanks 213A, 213B the transmit coils 114A, 114B, the bridge inverter 217, and the switching circuit 219 coupled together to generate the wireless power signal 105 (FIG. 1). The transmitter controller 218 (FIG. 2) is not shown in FIG. 3A.

The first resonance tank 213A may include the first transmit coil 114A and the first resonant capacitor 215A coupled in series. It should be recognized that although a single capacitor is shown for the first resonant capacitor 215A, various numbers and configurations of capacitors may be employed. For example, the first resonant capacitor 215A may include a plurality of capacitors coupled in parallel with each other. In addition, different configurations may include capacitors on other sides of the first transmit coil 214A than the specific configuration shown. Additional circuit elements (e.g., resistors, inductors) may be included within the first resonance tank 213A for an LC network that may impact the resonance of the first resonance tank 213A.

The second resonance tank 213B may include the second transmit coil 114B and the second resonant capacitor 215B coupled in series. It also should be recognized that although a single capacitor is shown for the first resonant capacitor 215B, various numbers and configurations of capacitors may be employed. For example, the first resonant capacitor 215B may include a plurality of capacitors coupled in parallel with each other. In addition, different configurations may include capacitors on other sides of the second transmit coil 214B than the specific configuration shown. Additional circuit elements (e.g., resistors, inductors) may be included within the second resonance tank 213B for an LC network that may impact the resonance of the second resonance tank 213B.

As discussed above, the bridge inverter 217 may be configured as a full bridge inverter, which may include switches 302, 304 coupled at one end of the transmit coils 114A, 114B at node A, and switches 306, 308 coupled at the other end of the transmit coils 114A, 114B at node B. In other words, the first transmit coil 114A and the second transmit coil 114B may be coupled between nodes A and B in parallel paths. The gates to the switches 302, 304, 306, 308 may be controlled by the transmitter controller 218 (FIG. 2) according to a desired operating frequency in order to generate the AC signal alternating on nodes A, B. Thus, a single full bridge inverter may be used to drive at least two transmit coils 114A, 114B.

The switching circuit 219 may include switches 310, 312, 314, 316 that are configured to effectively isolate the transmit coils 114A, 114B from each other. The first switch 310 and the second switch 312 may be coupled between nodes A, B in the same path as the first transmit coil 114A. In particular, the first switch 310 may be coupled between node A and the first transmit coil 114A, and the second switch 312 may be coupled between node B and the first transmit coil 114A. The third switch 314 and the fourth switch 316 may be coupled between nodes A, B in the same path as the second transmit coil 114B. In particular, the first switch 310 may be coupled between node A and the first transmit coil 114A, and the second switch 312 may be coupled between node B and the first transmit coil 114A.

Each of the switches 310, 312, 314, 316 may be serially coupled with their respective resonance tanks 213A, 213B. The drains of each of the switches 310, 314 are coupled with node A, while the drains of each of the switches 312, 316 are coupled with node B. The sources of switches 310, 312 are coupled to opposite sides of the first resonance tank 213A, while the sources of each of the switches 314, 316 are coupled to opposite sides of the second resonance tank 213B. Thus, each parallel path of the transmit coil 114 may include at least two switches and one of the resonance tanks coupled in series.

The switching circuit 219 may also be configured to clamp voltages generated by the unused coil using clamping elements. For example, diodes 311, 313, 315, 317 may be coupled across of each of the switches 310, 312, 314, 316, respectively. For example, a first diode 311 may be coupled across switch 310, a second diode 313 may be coupled across switch 312, a third diode 315 may be coupled across switch 314, and a fourth diode 317 may be coupled across switch 316. Each of the diodes 311, 313, 315, 317 may be internal body diodes of their respective switches 310, 312, 314, 316. In addition, each of the diodes 311, 313, 315, 317 may be oriented such that the anode may be coupled on the side of the respective transmit coil 114A, 114B, and the cathode may be coupled on the side of the respective node A, B. Thus, the diodes 311, 313, 315, 317 may be common source diodes pointing (anode to cathode) away from the transmit coils 114A, 114B. As a result, the diodes 311, 313, 315, 317 may extract the energy out of the unused transmit coil 114 toward the switch nodes (nodes A, B) to be recycled back into the main loop. By reducing and recycling the energy generated by the unused transmit coil 114 along with the improved clamping, lower voltage rated transistors may be used during normal operation compared with conventional solutions. Thus, the cost may be reduced.

In operation, one of the transmit coils 114A, 114B may be enabled for wireless power generation while the other transmit coil 114A, 114B may be disabled responsive to the switching circuit 219. Thus, according to the configuration shown in FIG. 3A, the wireless power transmitter 112 may be a full bridge dual transmitter in which one transmit coil 114A, 114B is used and the other transmit coil 114A, 114B is unused. The switches 310, 312 may be enabled to cause the first transmit coil 114A to be active by applying an enabling voltage to a first control signal CTLA. The switches 314, 316 may be enabled to cause the first transmit coil 114B to be active by applying an enabling voltage to a second control signal CTLB. The first control signal CTLA and the second control signal CTLB may be selected as either an enabling voltage (e.g., $V_{IN}$) or a disabling voltage (e.g., GND). In some embodiments, the enabling voltage may be increased above $V_{IN}$, for example, by using a charge pump, additional power supply, or other boosting methods as desired to comply with the gate to source voltage of the switch selected to operate the desired power transfer path.

For purposes of this example, it will be assumed that the second transmit coil 114B is used (i.e., active) with an enabling voltage (e.g., CTLB=$V_{IN}$+5V) being applied to the gates of switches 314, 316, and the first transmit coil 114A is unused (i.e., inactive) as indicated by a non-enabling voltage (e.g., CNLA=GND) being applied to the gates of switches 310, 312. Thus, at times the first transmit coil 114A may be referred to as the unused coil, and the second transmit coil may be referred to as the used coil.

During wireless power transfer, the unused coil 114A may couple with the wireless power signal 105 generated by the used coil 114B. For this example, the clamping effects on the unused coil 114A will be discussed. During this discussion, node C refers to the node on the anode side of the diode 311 that is coupled with the dot side of the transmit coil 114A. Node C is also the node at which the source of the switch 310 is coupled. Node D refers to the node on the anode side of the diode 313 that is coupled with the resonance capacitor 215A. Node D is also the node at which the source of the switch 312 is coupled. Node E and node F are the corresponding nodes for the transmit coil 114B, and would result in the same operation when the transmit coil 114B is the unused coil.

In operation of the path of the unused coil 114A, when the magnetic field causes a parasitic voltage at node C to be negative, the switch 310 may turn on at the gate-to-source threshold voltage ($V_{TH}$) for the switch 310. Similarly, when the magnetic field causes a parasitic voltage at node D to be negative, the switch 312 may turn on at the gate-to-source threshold voltage ($V_{TH}$) for the switch 312. As a result, the voltage at nodes C and D may be limited to a maximum negative voltage (e.g., between −1V and −3V with respect to the gate drive voltage) that depends on the particular transistors selected for the switches 310, 312. When the magnetic field causes a parasitic voltage at node C to be positive, the diode 311 may clamp at the turn on voltage for the diode 311. Similarly, when the magnetic field causes a parasitic voltage at node D to be positive, the diode 313 may clamp at the turn on voltage for the diode 313. As a result, the voltage at nodes C and D may be limited to a maximum positive voltage (e.g., $V_{IN}$) that depends on the particular turn on voltage for the diodes 311, 313. As resonance tanks swing more negative and positive, more and more energy may be driven. Nodes C and D may be clamped in the positive direction and the negative direction by the natural effects of the switches 310, 312 (e.g., through $V_{GS}$ for negative voltages, and body diodes for positive voltages).

In order to improve efficiency, a dot convention may be applied to the physical windings of the transmit coils 114A, 114B such that when the magnetic field generates a positive voltage on at node C for the unused coil 114A, node A may be simultaneously forced to a high voltage (e.g., $V_{IN}$) to minimize the voltage drop across the switch 310. Then with the used coil's 114B current direction, the magnetic field may drive the unused coil's 114A voltage low on node C when node A is being forced low (e.g., 0V) by the bridge inverter 217.

As shown in FIG. 3A, the dot convention of the transmit coils 114A, 114B may be configured such that the dots of both transmit coils 114A, 114B face away from the capacitors 215A, 215B; however, it is contemplated that some embodiments may include the transmit coils 114A, 114B may be configured such that the dots of both transmit coils 114A, 114B pointing toward the capacitors 215A, 215B. In addition, some embodiments may include the dot of one transmit coil (e.g., transmit coil 114A) pointing toward the capacitor (e.g., capacitor 215A), while another transmit coil (e.g., transmit coil 114B) points away from the capacitor (e.g., capacitor 215B). For embodiments that include more than two transmit coils, it is contemplated that any combination of dot conventions for the transmit coils pointing toward or away from the capacitors.

In some embodiments, the clamping elements across the switches may include an actively driven element (e.g., an FET switch), which may be desirable for implementations where the voltage clamping requirements may be relatively high. In such an embodiment, the energy of the unused transmit coils 114 may be monitored, and the corresponding actively driven element may be enabled for a brief period of time to deplete the energy generated by the unused coil. In some embodiments, the switches 310, 312 themselves may be enabled and actively driven for a brief period of time to deplete the energy generated by the unused coil. In some embodiments, a combination of passive and active clamping may be employed.

Figure 3B:
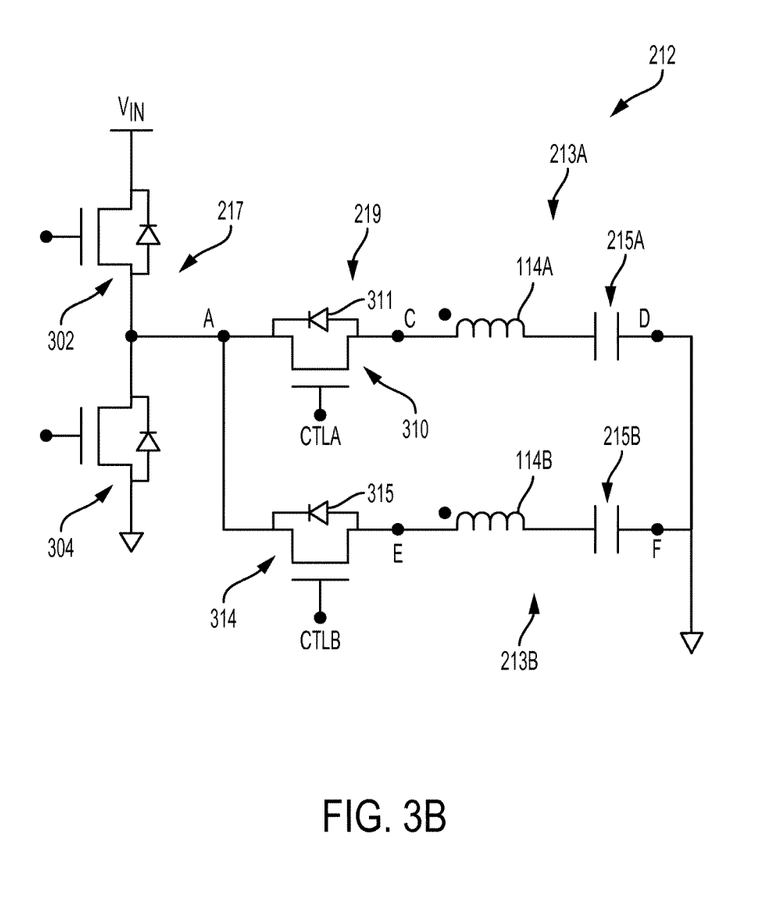
FIG. 3B is a simplified schematic diagram of the wireless power transmitter of FIG. 2 according to another embodiment of the present disclosure.

FIG. 3B is a simplified schematic diagram of the wireless power transmitter 112 of FIG. 2 according to another embodiment of the present disclosure. As discussed above, the wireless power transmitter 112 may include the resonance tanks 213A, 213B the transmit coils 114A, 114B, the bridge inverter 217, and the switching circuit 219 coupled together to generate the wireless power signal 105 (FIG. 1). The transmitter controller 218 (FIG. 2) is not shown in FIG. 3B. The bridge inverter 217 of FIG. 3B is in a half bridge configuration, such that each switch 310, 314 and clamping element 311, 315 pair is serially coupled on a single side of its respective transmit coil 114A, 114B. Each path of the transmit coils 114A, 114B may be in parallel as described above.

Figure 4:
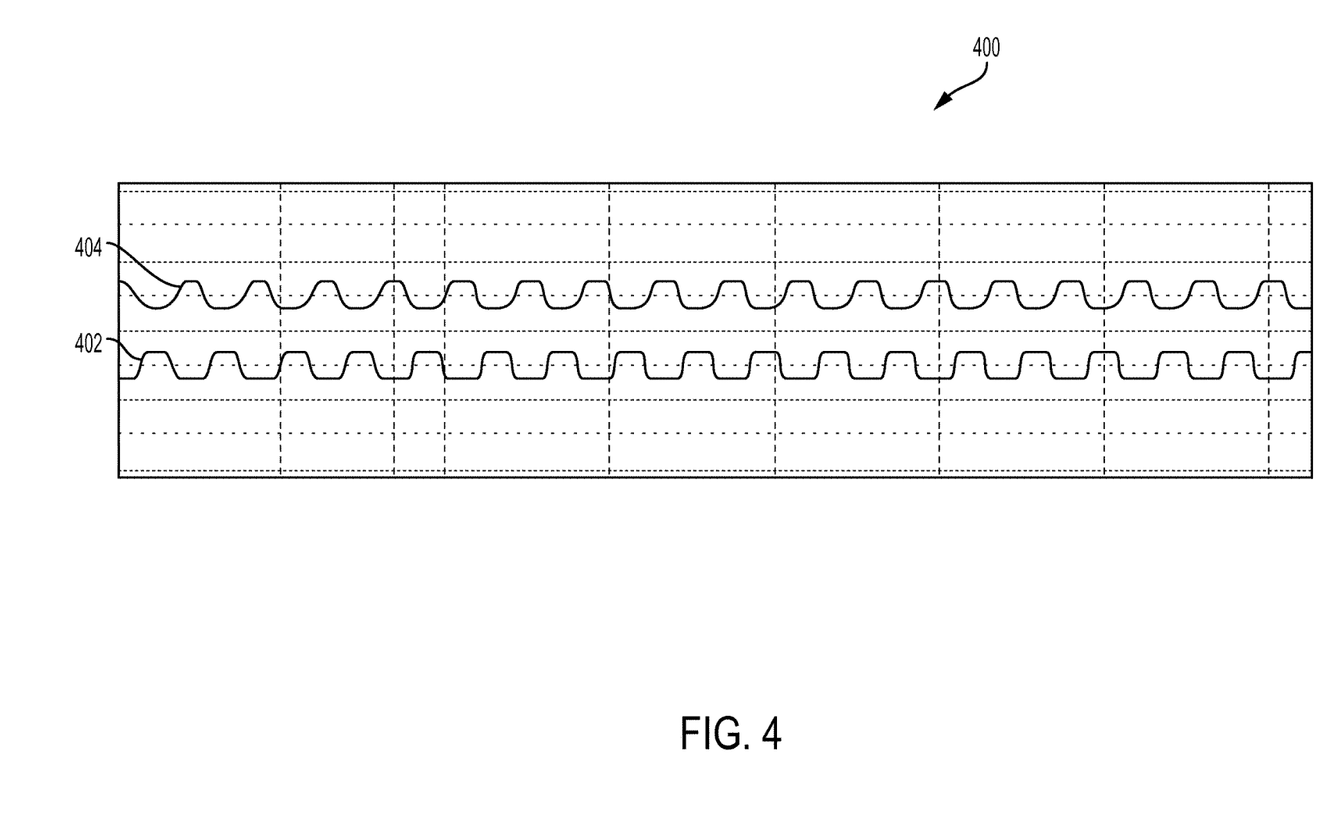
FIG. 4 is a waveform of a test simulation on a wireless power transmitter having a plurality of transmit coils according to an embodiment of the present disclosure.

FIG. 4 is a waveform 400 of a test simulation on a wireless power transmitter having a plurality of transmit coils according to an embodiment of the present disclosure. Voltage signal 402 is the voltage measured on a first side (e.g., node C) of the unused coil 114A, and voltage signal 404 is the voltage measured on a second side (e.g., node D) of the unused coil 114A. As shown in the waveform 400, as the voltage signals 402, 404 at nodes C, D may alternate and clamp as the parasitic voltage on the respective node CD is positive such that the voltage across the diode reaches the turn on voltage.

Figure 5:
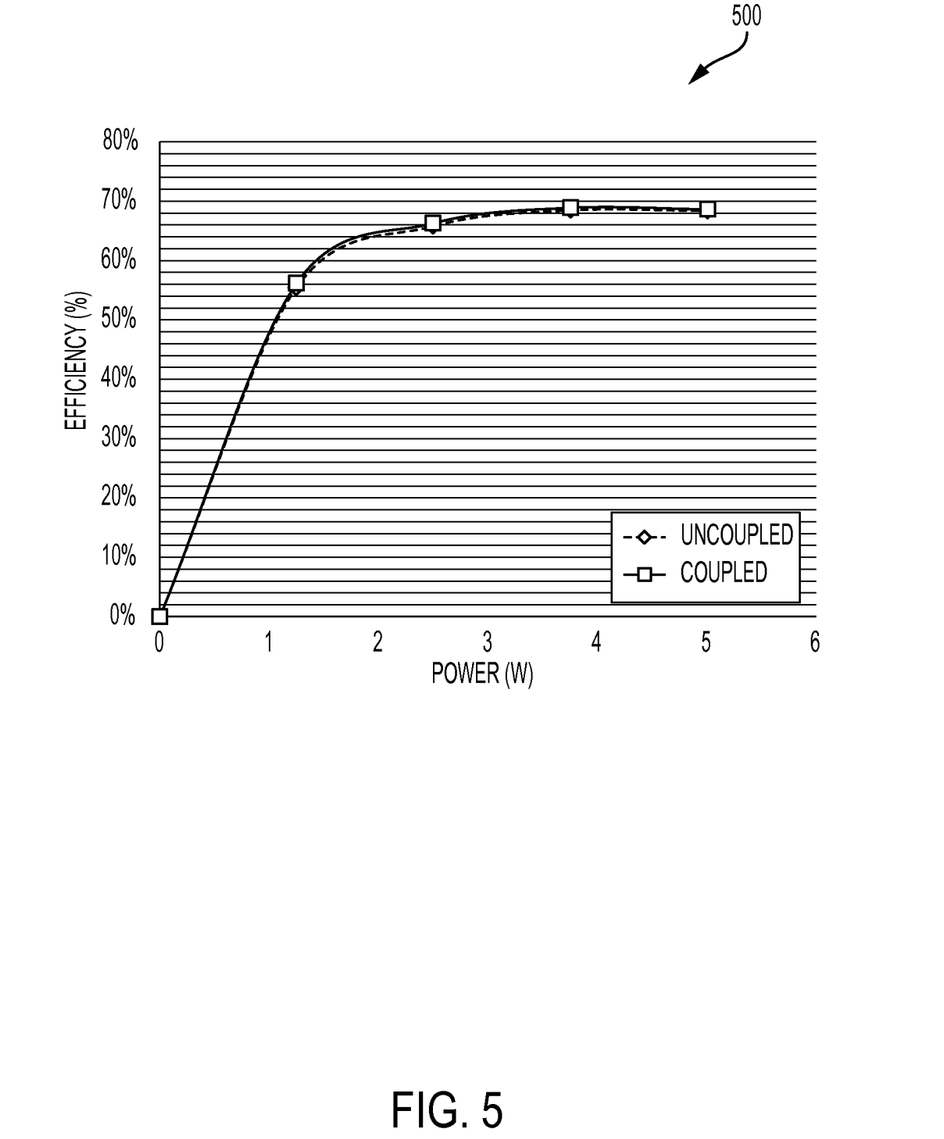
FIG. 5 is a graph illustrating efficiency as a function for power for an uncoupled state and a coupled state.

FIG. 5 is a graph 500 illustrating efficiency as a function for power for an uncoupled state (i.e., only one transmit coil present) and a coupled state (i.e., a plurality of transmit coils present). The unused coil of the coupled state may be configured with the clamping elements as described herein. Thus, the efficiency of a multiple transmit coil embodiment with the use of the clamping elements may be substantially similar as a single coil system.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventor.

What is claimed is:

1. A wireless power enabled apparatus, comprising:
a wireless power transmitter, including:
a plurality of transmit coils configured to generate a wireless power signal for wireless power transfer to a wireless power receiver;
a bridge inverter configured to generate an AC signal to pass through the plurality of transmit coils; and
a switching circuit operably coupled with the plurality of transmit coils and configured to enable and disable each of the plurality of transmit coils responsive to control signals from a transmitter controller, wherein the switching circuit includes:

a first plurality of switches serially coupled on opposing sides of a first transmit coil of the plurality of transmit coils;
a first plurality of clamp elements, each clamp element coupled across a respective switch of the first plurality of switches and configured to extract energy away from the first transmit coil;
a second plurality of switches serially coupled on opposing sides of a second transmit coil of the plurality of transmit coils; and
a second plurality of clamp elements, each clamp element coupled across a respective switch of the second plurality of switches and configured to extract energy away from the second transmit coil.

2. The wireless power enabled apparatus of claim 1, wherein the first plurality of clamp elements and the second plurality of clamp elements are diodes having an anode-cathode arrangement pointing away from their corresponding transmit coils.

3. The wireless power enabled apparatus of claim 2, wherein the diodes are body diodes of its corresponding switch.

4. The wireless power enabled apparatus of claim 1, wherein the first plurality of clamp elements and the second plurality of clamp elements are active elements driven by the transmitter controller.

5. The wireless power enabled apparatus of claim 1, wherein the bridge inverter is configured to be operated as at least one of a full bridge inverter and a half bridge inverter.

6. The wireless power enabled apparatus of claim 5, wherein the switching circuit further includes additional sets of switches and corresponding clamp elements coupled on opposing sides of additional transmit coils of the plurality of transmit coils.

7. The wireless power enabled apparatus of claim 1, further comprising a mobile electronic device including the wireless power transmitter.

8. The wireless power enabled apparatus of claim 1, wherein each of the first transmit coil and the second transmit coil have a dot convention with the dot pointing in a same direction.

9. A wireless power enabled apparatus, comprising:
a bridge inverter configured to generate an AC signal at an operating frequency;
a plurality of parallel paths operably coupled to the bridge inverter, each path configured to be independently enabled and disabled for generating a wireless power signal responsive to the AC signal, wherein each path of the plurality of parallel paths includes:
a resonance tank including a transmit coil coupled with at least one resonance capacitor;
a first switch serially coupled with the resonance tank and switching node A of the bridge inverter;
a first clamping element in parallel with the first switch that facilitates transfer of energy away from the resonance tank to switching node A;
a second switch serially coupled with the resonance tank and switching node B of the bridge inverter; and
a second clamping element in parallel with the second switch that facilities transfer of energy away from the resonance tank to switching node B.

10. The wireless power enabled apparatus of claim 9, wherein the first clamping element and the second clamping element are common source diodes with their corresponding switch.

11. The wireless power enabled apparatus of claim 10, wherein the first clamping element and the second clamping element are body diodes for their corresponding switch.

12. The wireless power enabled apparatus of claim 11, wherein the body diodes are pointed toward their respective switching node A and switching node B to which they are coupled.

13. The wireless power enabled apparatus of claim 9, wherein the plurality of parallel paths include more than two parallel paths coupled to the same bridge inverter.

14. The wireless power enabled apparatus of claim 9, wherein the transmit coil for each parallel path is configured according to a dot convention that is selected from the group consisting of:
a dot for the transmit coil of each parallel path being on a side opposite from the at least one resonance capacitor;
a dot for the transmit coil of each parallel path being on a side pointing toward the at least one resonance capacitor; and
dots for the different transmit coils having a combination of being on a side pointing toward the at least one resonance capacitor or away from the at least one resonance capacitor.

15. The wireless power enabled apparatus of claim 14, wherein the at least one resonance capacitor includes a plurality of capacitors coupled in parallel with each other.

16. A method of operating a wireless power enabled apparatus having a plurality of transmit coils, the method comprising:
generating a wireless power signal through a used coil in a first parallel path responsive to an AC signal generated by a bridge inverter; and
clamping a parasitic voltage generated in at least one unused coil in at least one additional parallel path such that energy is recycled from the at least one unused coil into a main loop of the used coil through a clamp element across a switch in the at least one parallel path for the at least one unused coil.

17. The method of claim 16, wherein energy is recycled from a plurality of unused coils in a plurality of different parallel paths and into the main loop of the used coil.

18. The method of claim 16, wherein clamping the parasitic voltage occurs at a same node through the switch at a negative voltage and through the clamp element at a positive voltage.

19. The method of claim 16, wherein generating the wireless power signal through the used coil results in the used coil and the unused coil being weakly coupled to generate the parasitic voltage.

20. The method of claim 19, wherein the parasitic voltage has a level that is less than a foreign object detection error budget.

21. A wireless power transmitter, comprising:
a bridge inverter configured to generate an AC signal;
a plurality of tank circuits, each of the tank circuits including a transmit coil;
a switching circuit configured to selectively couple each of the plurality of tank circuits to receive the AC signal from the bridge inverter according to signals from a controller,
wherein the switching circuit includes a clamp circuit for each of the plurality of tank circuits that are configured to direct power from uncoupled ones of the plurality of tank circuits to coupled ones of the plurality of tank circuits.

22. The transmitter of claim 21, wherein the controller determines which of the plurality of tank circuits to couple to the bridge inverter in response to a location of a receiver.

23. The transmitter of claim 21, wherein the switching circuit includes at least one transistor in parallel with one of the clamp circuit.

24. The transmitter of claim 23, wherein one of the at least one transistor and clamp circuit are provided in series on each side of the tank circuit.

* * * * *